United States Patent [19]

Sparer et al.

[11] Patent Number: 4,815,870
[45] Date of Patent: Mar. 28, 1989

[54] RECEIVER CLAMPING ARRANGEMENT FOR THERMAL PRINTERS

[75] Inventors: Steven J. Sparer, Rochester; William I. Morris, Oakfield, both of N.Y.

[73] Assignee: Eastman Kodak Company, Rochester, N.Y.

[21] Appl. No.: 111,236

[22] Filed: Oct. 22, 1987

[51] Int. Cl.$^4$ .................. B41J 3/02; G01D 15/24
[52] U.S. Cl. .................. 400/120; 346/138; 271/277
[58] Field of Search .......... 400/120; 346/76 PH, 346/103, 138, 125; 271/277

[56] References Cited

U.S. PATENT DOCUMENTS

| | | | |
|---|---|---|---|
| 2,701,177 | 2/1955 | Rennes | 346/103 |
| 3,808,603 | 4/1974 | Degreve et al. | 346/138 |
| 3,966,187 | 6/1976 | Beduchaud et al. | 271/277 |
| 4,135,198 | 1/1979 | Fujimoto | 346/138 |
| 4,179,118 | 12/1979 | Huss | 271/277 |
| 4,259,695 | 3/1981 | Nauano | 346/138 |
| 4,386,771 | 6/1983 | Lakdawia | 271/82 |
| 4,594,597 | 6/1986 | Liu et al. | 346/76 |
| 4,705,414 | 11/1987 | Guy et al. | 400/120 |
| 4,750,880 | 6/1988 | Stephenson et al. | 400/120 |

Primary Examiner—Eugene H. Eickholt
Attorney, Agent, or Firm—Raymond L. Owens

[57] ABSTRACT

A sheet clamping apparatus for a thermal printer drum includes a clamping lever mounted in a recess of the drum, fixed cam members, and a mechanism mounted on an end surface of the drum and connected to the clamping lever and operatively associated with the cam members for moving the lever between open sheet receiving and ejecting positions and a closed sheet clamping position as the drum rotates.

1 Claim, 4 Drawing Sheets

RECEIVER CLAMPING ARRANGEMENT FOR THERMAL PRINTERS

FIELD OF THE INVENTION

The present invention relates to thermal printers and more particularly, to mechanisms for clamping receiver sheets to drums.

BACKGROUND OF THE INVENTION

In a typical thermal printer, a web-type dye-carrier containing a series of spaced frames of different colored heat transferable dyes is spooled on a carrier supply spool. The carrier is paid out from the supply spool and rewound on a take up spool. The carrier moves through a nip formed between a thermal print head and a dye-absorbing receiver sheet. The receiver sheet is clamped to a rotatable drum. The receiver sheet may, for example, be coated paper and the print head is formed of a plurality of heating elements. When heat is supplied to the dye-carrier, dye is transferred to the receiver sheet.

At the beginning of a print cycle, the receiver sheet must be clamped to the drum which is at a home position. After being clamped to the drum, the receiver is advanced under the print head. The heating elements of the print head are energized to form a dye image. The drum makes several revolutions as different colored dye images are applied into the receiver. In this way, a final, full-colored image is produced. After this full-colored image is produced, the direction of the drum is reversed, and when a position is reached the clamp is opened and the receiver sheet is ejected from the thermal printer. The drum then advances the clamping mechanism back to the home position and the above process is repeated.

The process of clamping the receiver sheet to the drum must be done in a manner that prevents the receiver sheet from moving during dye transfer. Movement of as little as 0.010 inch can be detected and reduces the image sharpness of the full color image.

Often the clamping mechanism engages a large border portion of the leading edge of the receiver. This border portion is a non-printable area since it is disposed underneath the clamp.

SUMMARY OF THE INVENTION

Accordingly, it is an object of this invention to provide an improved clamping arrangement which clamps a receiver sheet to a drum while permitting sharp thermal images to be made with minimal borders.

This object is achieved in a thermal printer apparatus in which dye is transferred from a dye-carrier to a receiver sheet by heat applied from a print head which forms a nip by pressing the carrier against the receiver sheet, the receiver sheet being mounted on a rotatable drum having a platen surface and end surfaces and wherein said drum is rotatable in a first direction during image transfer and in a second direction for sheet ejection, sheet clamping apparatus comprising:

(a) said drum defining a recess extending across its width;

(b) a clamp mechanism including a pivotably mounted member mounted on an end surface of said drum, a clamping lever disposed in said recess and connected to said pivotably mounted member, and spring means fixed to said drum and said pivotably mounted member to urge said pivotably mounted member to move to a position which causes said clamping lever to move from an open sheet receiving or ejecting position to a closed sheet clamping position;

(c) spaced first and fixed spaced cam members each having interior and exterior camming surfaces; and (d) a link pivotably mounted on said end surface and including a portion engageable with said pivotably mounted member and a follower engageable with said interior and exterior camming surfaces of said cam member so that as said drum rotates in said first direction said follower engages said interior camming surfaces and said lever is in the closed sheet clamping position and when said drum rotates in said second direction said follower moves between said cam members onto the exterior camming surface of one of such cam member until it reaches a position where said link moves said pivotably mounted member to cause said clamping lever to move to the open position for sheet ejection.

An advantage of this apparatus is that it constrains a receiver sheet on a drum permitting a sharp thermal image to be transferred to the receiver sheets with minimal blank borders on the receiver.

MODES OF CARRYING OUT THE INVENTION

Figure 1:
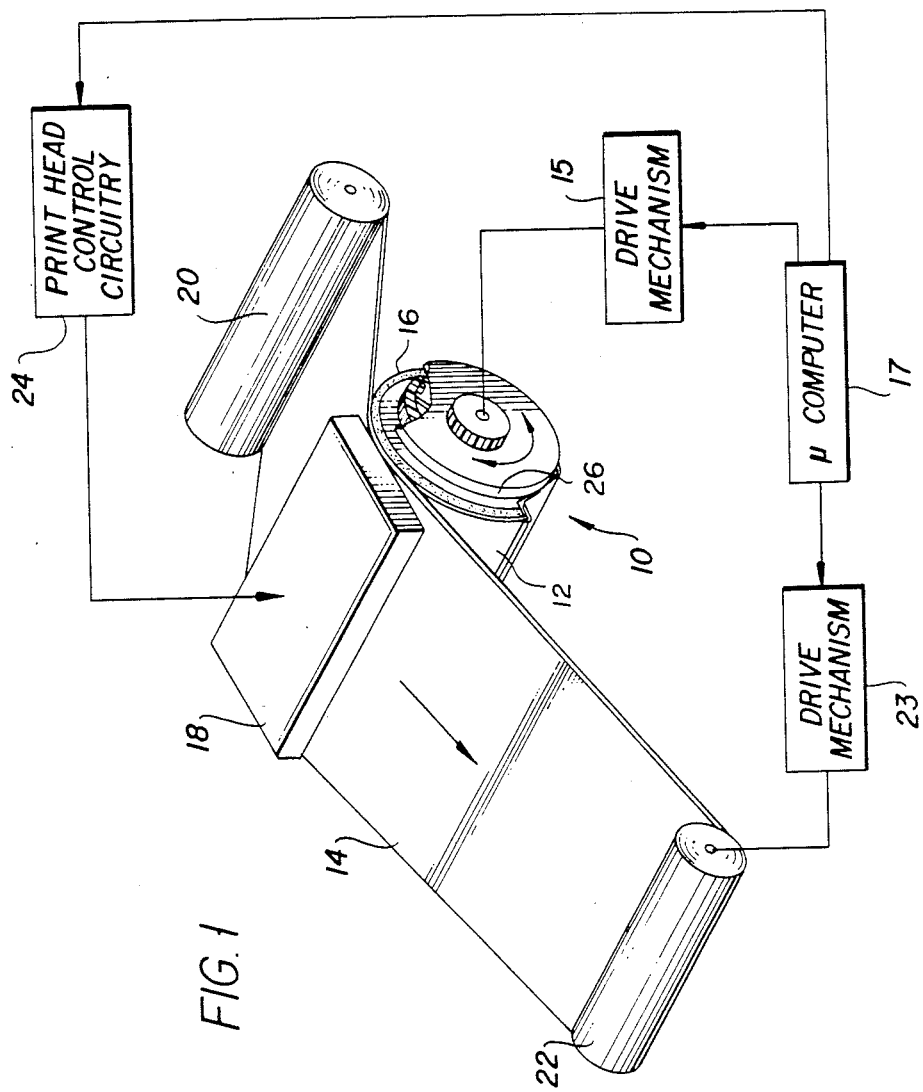
FIG. 1 is a schematic of a thermal printer apparatus which can be used to make colored images in a receiver.

Turning first to FIG. 1 where there is shown a thermal printing apparatus 10 which uses a dye-carrier 14 and a receiver sheet 12. The receiver sheet 12 is clamped to a rotatable drum 16 which is mechanically coupled to a drive mechanism 15. It will be understood that the drive mechanism 15 can advance the drum in either clockwise or counterclockwise directions. When the drum 16 is being advanced in a counterclockwise direction, dye from the carrier 14 is transferred into the receiver sheet at a nip position. A microcomputer 17 controls the operation of mechanism 15. Thermal print head 18 presses the dye-carrier 14 and the receiver sheet 12 against the surface of the drum 16. The carrier 14 is driven along a path from the supply roller 20 onto a take up roller 22 by a drive mechanism 23 coupled to the take up roller 22. Microcomputer 17 also controls the drive mechanism 23. Drive mechanisms 15 and 23 each include motors which respectively advance the carrier and rotate the drum in either the clockwise or counterclockwise direction. Heating elements of a print head 18 are selectively energized by a drive circuit 24 which is also controlled by the microcomputer 17.

It will be understood to those skilled in the art that the dye-carrier member 14 can be formed with a repeating series of thermally transferable dye frames. Each series includes a frame of yellow, magenta and cyan dye frames. A single series is used to print one colored image in the receiver member 12. In this way, the drum 16 must rotate the receiver sheet 12 past the print head 18 three separate times to form a full colored image. The first time a yellow image is formed, the second time a magenta dye image is formed superimposed on the yellow dye image, and the third time a cyan dye image is formed superimposed on the first two dye color images to complete the full color image.

Figure 2:
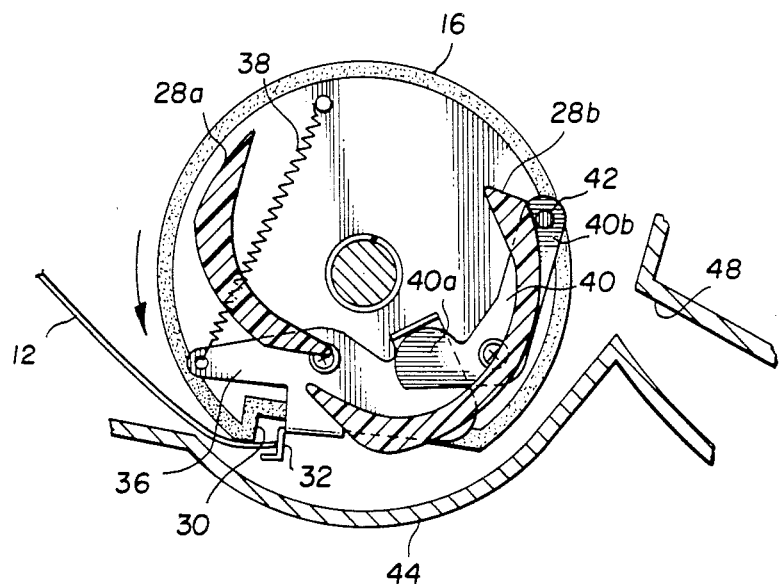
FIG. 2 is a side view showing the clamping apparatus in its home position with the clamping lever in an open sheet receiving position.
Figure 3:
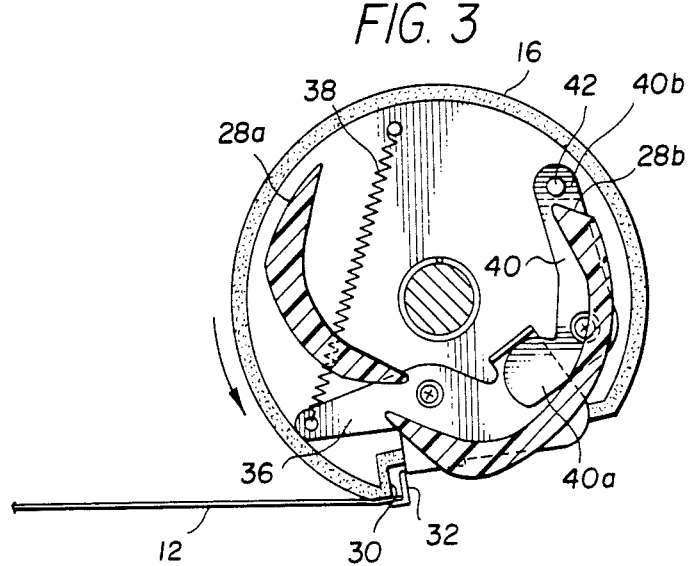
FIG. 3 is a side view showing the clamping lever in a closed position engaging a sheet with the drum being rotated in a counterclockwise direction.
Figure 4:
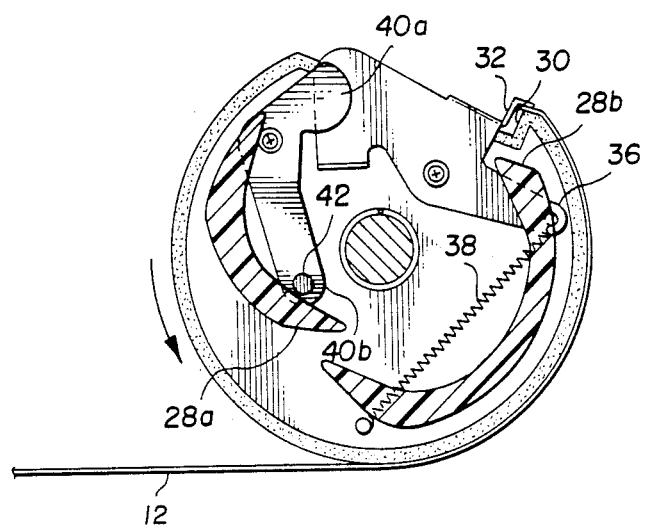
FIG. 4 is a side view which continues to show the clamping lever in a closed position as the drum continues in a counterclockwise direction.
Figure 5:
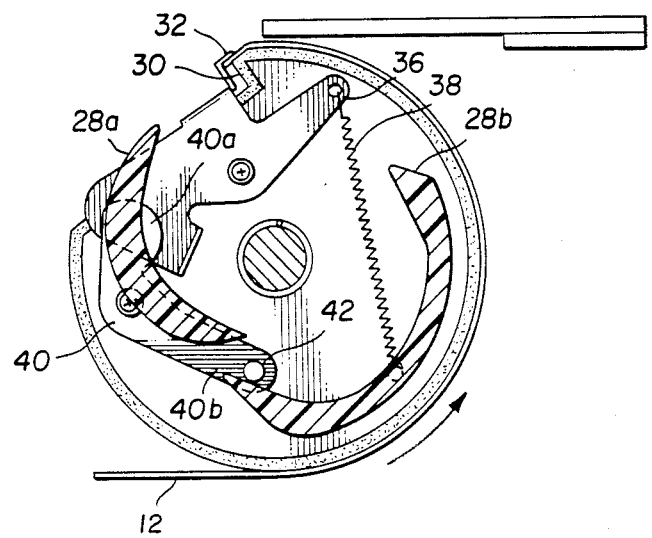
FIG. 5 shows the drum rotated in a counterclockwise direction.
Figure 6:
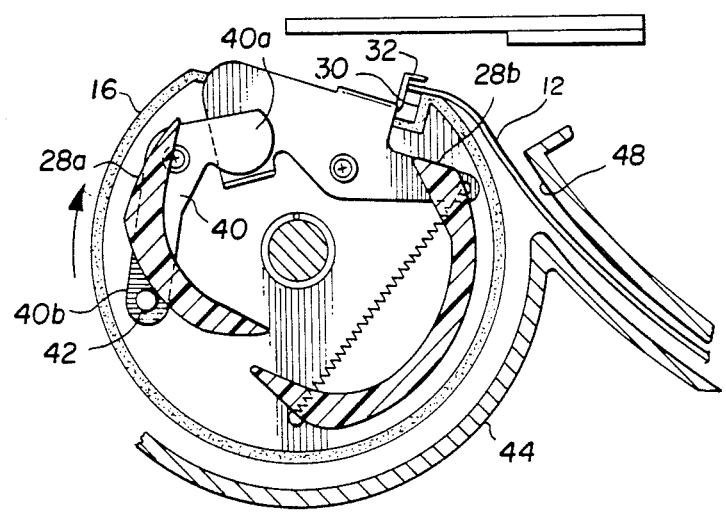
FIG. 6 shows the drum rotation in a clockwise direction during sheet ejection.

Turning now to FIG. 2, where a side view of the drum 16 is shown. Also a fixed plate 26 (see FIG. 1) includes two cam members 28a and 28b. The drum 16 has a platen surface that is formed with a cut-out recess 30. Within this recess there is provided a clamping lever 32 which is fixedly connected to two separate pivotally mounted members 36. These members 36 are pivotally mounted on the opposite end surfaces of the drum 16. Only one such member 36 is shown. Each of the pivotably mounted members 36 is secured to a tension spring 38 which is fixed to an end surface and which urges these members 36 so that the clamping lever 32 is moved to a sheet clamping position which is shown in FIGS. 3-5.

Pivotably mounted on the depicted end surface of the drum 16, is a link 40 which is in the form of a bell crank and has arms 40a and 40b. Arm 40a includes a portion which is engageable with a projection formed on member 36. Arm 40b is provided with a cam follower 42. Cam follower 42 is engageable with interior and exterior camming surfaces formed on the two fixed cams 28a and 28b.

Operation of the clamping apparatus will best be understood with reference to FIGS. 2-6. In FIG. 2, the drum 16 is shown in its home position and lever 32 is in its open position. In this home position, the follower 42 is engageable with the exterior surface of the fixed cam member 28b and the link 40 drives the pivotably mounted member 36 against the urging of spring 38 so that the clamping lever is in its open position. After a sheet has been delivered along a path defined by the top surface of a sheet guide 44, the drum 16 is rotated in a counterclockwise direction to the position shown in FIG. 3 where approximately 15° from the home position the follower 42 falls away from the exterior camming surface of member 28b allowing the clamping lever 32 to pinch the receiver sheet 16 against the drum surface as shown. Since the clamping lever 32 is recessed inside the recess of the drum, it has been found possible to design the clamp so as to use only 0.075 inch of the receiver sheet for positive clamping. The clamping lever 32 is designed to always be below the surface of the drum 16 when it is clamping the receiver. As the drum continues to rotate in a counterclockwise position, the follower 42 will engage first the interior camming surface of the cam member 28a (see FIG. 4). The cam follower 42 will only make contact with the interior camming surfaces of members 28a and 28b respectively as the full color image is formed. After the cyan image has been transferred and a full-color image completed, the follower 42 will be in engagement with the interior surface of the cam member 28b. In order to eject the finished receiver sheet out of the thermal printing apparatus, the direction of rotation of the drum 16 is reversed and the follower will move between the opening formed between cams 28a and 28b onto the exterior camming surface of the cam member 28b. A position will finally be reached where the profile of the exterior camming surface of the cam member 28b causes the link 40 to move the pivotably mounted members 36 to cause the clamping lever 32 to be raised to its open position. The drum 16 will continue to drive in a clockwise direction driving the sheet out through an exit guide chute 48. See FIG. 6. Once the sheet is positioned in the exit guide chute 48, the drum 16 reverses its direction and is rotated to its home position where the clamping lever 32 is open and awaits the next receiver sheet. (See FIG. 2.)

The invention has been described in detail with particular reference to certain preferred embodiments thereof, but it will be understood that variations and modifications can be effected within the spirit and scope of the invention.

We claim:

1. In a thermal printer apparatus in which dye is transferred from a dye-carrier to a receiver sheet by heat applied from a print head which forms a nip by pressing the carrier against the receiver sheet, the receiver sheet being mounted on a rotatable drum having a platen surface and end surfaces and wherein said drum is rotatable in a first direction during image transfer and in a second direction for sheet ejection, sheet clamping apparatus comprising:
   (a) said drum defining a recess extending across its width;
   (b) a clamp mechanism including a pivotably mounted member mounted on an end surface of said drum, a clamping lever disposed in said recess and connected to said pivotably mounted member, and spring means fixed to said drum and said pivotably mounted member to urge said pivotably mounted member to move to a position which causes said clamping lever to move from an open sheet receiving or ejecting position to a closed sheet clamping position;
   (c) spaced first and fixed spaced cam members each having interior and exterior camming surfaces; and
   (d) a link pivotably mounted on said end surface and including a portion engageable with said pivotably mounted member and a follower engageable with said interior and exterior camming surfaces of said cam member so that as said drum rotates in said first direction said follower engages said interior camming surfaces and said lever is in the closed sheet clamping position and when said drum rotates in said second direction said follower moves between said cam members onto the exterior camming surface of one of such cam member until it reaches a position where said link moves said pivotably mounted member to cause said clamping lever to move to the open position for sheet ejection.

* * * * *